D. L. EWING.
Grain Cleaner.
No. 6,591. Patented July 17, 1849.
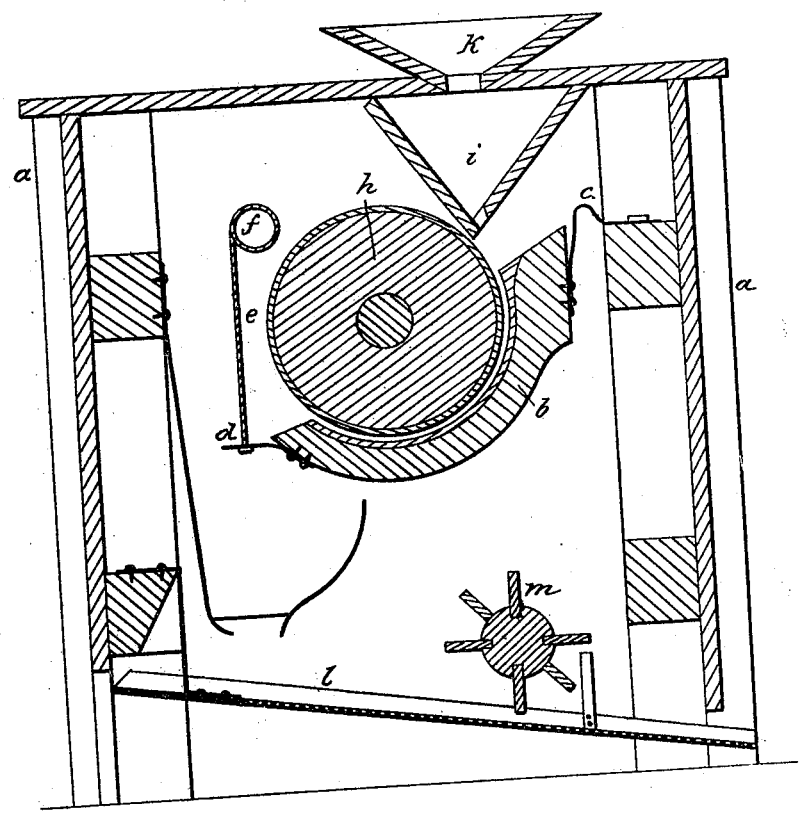

UNITED STATES PATENT OFFICE.

DAVID L. EWING, OF SPRUCE HILL, PENNSYLVANIA.

WHEAT-CLEANING MACHINE.

Specification of Letters Patent No. 6,591, dated July 17, 1849.

*To all whom it may concern:*

Be it known that I, DAVID L. EWING, of Spruce Hill, in the county of Juniata and State of Pennsylvania, have invented certain new and useful Apparatus for Cleaning Wheat from Rat-Dirt, &c., and that the following is a full, clear, and exact description of the principle or character which distinguishes it from all other things before known and of the usual manner of making, modifying, and using the same, reference being had to the accompanying drawings, which forms a part thereof, in which—

Figure 1, is a vertical longitudinal section.

The nature of my improvement consists in employing two extended rubbing surfaces, pressed together with a force sufficient to break any substance of less tenacity than wheat, but elastic so as to yield for any variation of feed, by which means rat dung and other similar substance is broken fine and by a blast of air carried away from the grain.

This apparatus is formed of the following parts, viz:—A case $a$ inclosing the machinery, and supported by proper frame work, in which is placed a concave $b$ supported at the upper end by a spring $c$, that connects it with the permanent frame, and at the lower end with another spring $d$, to the end of which spring there is a cord $e$ affixed that passes up, and is wound around a small windlass $f$ in the frame, by turning which the concave is raised and greater pressure is produced. Within the concave a running cylinder $h$ is located, the bearings of which are in the stationary frame, and it is driven by a pulley on its shaft outside the frame connected by a band with any driving power. The surfaces of the running cylinder $h$, and the concave $b$ are covered with leather or other similar substance, and the wheat to be cleaned is fed in through a spout $i$ and hopper $k$ and in issuing from between the rubbing surfaces, falls on to a screen $l$ below where it is winnowed, and receives a blast of air from a common fan $m$, the axle of which moves the riddle.

Having thus fully described my improvement in the machinery above named, what I claim therein as new, and for which I desire to secure Letters Patent, is—

The employment of the leather covered cylinder in combination with the leather covered spring concave constructed substantially as above described, for removing rat dirt and other substances, from wheat, as herein set forth.

DAVID L. EWING.

Witnesses:
J. J. GREENOUGH,
THOMAS ADAMS.